Oct. 26, 1926.
M. A. SMITH
1,604,935
LAMP LENS
Filed Feb. 13, 1926
2 Sheets-Sheet 1

INVENTOR
Maurice A. Smith
By Archworth Martin,
Attorney.

Oct. 26, 1926. 1,604,935
M. A. SMITH
LAMP LENS
Filed Feb. 13, 1926   2 Sheets-Sheet 2

INVENTOR
Maurice A. Smith
By Archworth Martin,
Attorney.

Patented Oct. 26, 1926.

1,604,935

UNITED STATES PATENT OFFICE.

MAURICE A. SMITH, OF JEANNETTE, PENNSYLVANIA, ASSIGNOR TO McKEE GLASS COMPANY, OF JEANNETTE, PENNSYLVANIA, A CORPORATION OF PENNSYLVANIA.

LAMP LENS.

Application filed February 13, 1926. Serial No. 88,039.

My invention relates to lamp lenses, and particularly to lenses that are especially suitable for use with headlights of motor vehicles.

One object of my invention is to provide a lens wherein various portions of a beam of light are so combined and refracted relatively to one another as to compensate for variations in the various bulbs and reflectors with which the lens may be used.

Another object of my invention is to provide a lens which casts a beam of light that is of maximum intensity at its top portion.

Still another object of my invention is to provide a lens wherein the light which is directed against the lens at its central portion and substantially on the horizontal axis of the lamp and reflector is refracted in such manner as to avoid glare and to intensify other portions of the beam of light.

Figure 1:
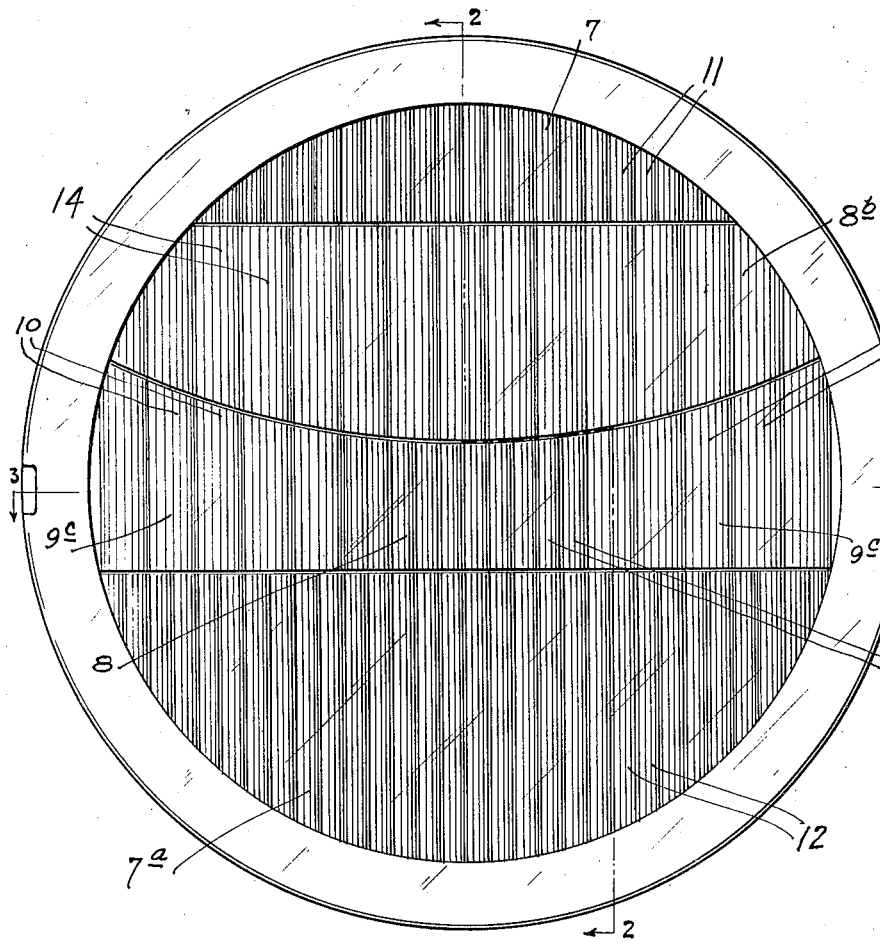
Figure 2:
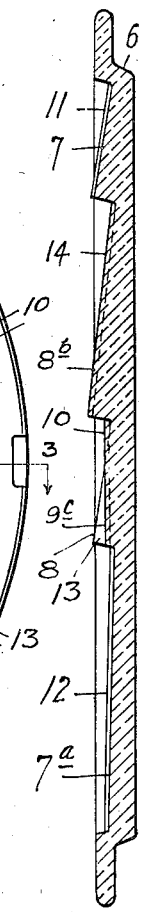
Figure 3:
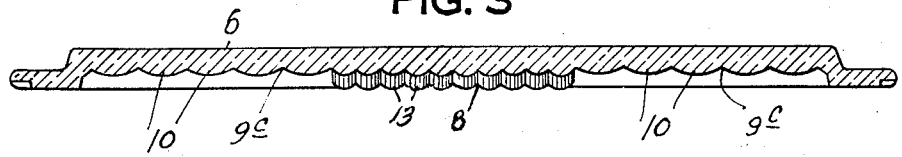
Figure 4:
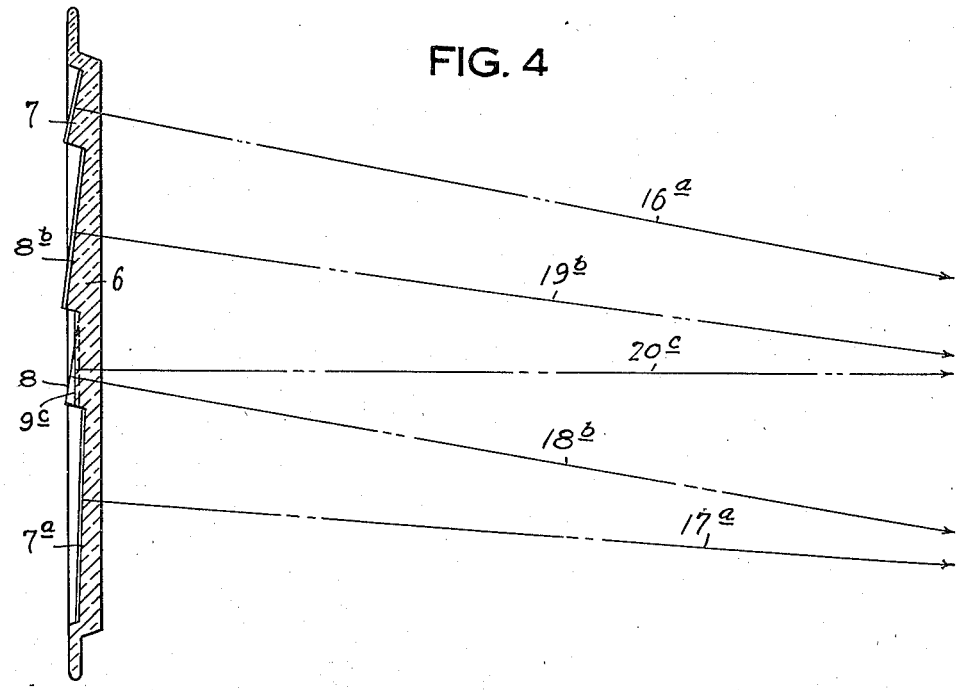

One form which my invention may take is shown in the accompanying drawing, wherein Fig. 1 is a rear elevational view of a lens embodying my invention; Fig. 2 is a view taken on the line 2—2 of Fig. 1; Fig. 3 is a view on the line 3—3 of Fig. 1; Fig. 4 is a diagrammatic view, showing the direction taken by those rays of light which are bent by the vertically refracting prisms, and Fig. 5 is a view showing the field of illumination produced by the vertically refracting prisms.

As above stated, the lens is particularly suitable for use with headlights of the usual type. The lens 6 is smooth on its outer surface, as shown more clearly in Figs. 2 and 3. A series of vertically refracting prisms extend across the rear face of the lens, these prisms being indicated at 7, 7ª, 8 and 8ᵇ. The portions 9ᶜ to either side of the prism 8 and between the prisms 7ª and 8ᵇ preferably have little or no vertical refracting function, but are provided with vertically disposed ribs or prisms 10 each refracting the light rays laterally or in a horizontal plane.

The horizontally disposed prisms 7 and 7ª are provided with vertically disposed ribs or prisms 11 and 12 respectively, each refracting the rays laterally in order to produce a beam having the desired degree of spread. Likewise, the horizontally disposed prisms 8 and 8ᵇ are provided with laterally refracting ribs or prisms 13 and 14, respectively.

Figure 5:
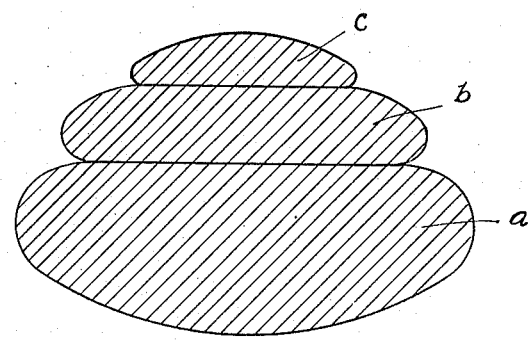

The light rays which pass through the horizontal prisms 7 and 7ª are bent downward as indicated by the lines 16ª and 17ª, respectively, and merge to form a field of illumination indicated in Fig. 5 by $a$, such field having a wide spread by reason of the angularity of the vertical prisms 11 and 12. The light which is directed through the prisms and 8 and 8ᵇ is refracted in the direction indicated by the lines 18ᵇ and 19ᵇ, respectively. The inclination of the prism 8 is less than that of the prism 8ᵇ so that the light lines 18ᵇ and 19ᵇ merge, to form a zone of light $b$ which, owing to the lesser degree of refraction by the vertical prisms 13 and 14 as compared to the lateral refractivity of the vertical prisms 11 and 12, produces a lateral spread less than the spread of the field $a$. The lateral and vertical refraction by the prisms 8 and 13, of the central portion of the light emanating from the lamp and its reflector, serves to eliminate the glare ordinarily present, without affecting the transmission of that portion of the light rays located at either side of said central portion, thus enabling the other light rays to be controlled in the most desirable manner.

The light transmitted through the portions 9ᶜ of the lens is directed in substantially a horizontal direction as indicated by the lines 20ᶜ, and forms the upper portion $c$ of the beam. A slight spread laterally is afforded by reason of the vertical prisms 10, but such spread is much smaller than in the zones $a$ and $b$, because a wider field of illumination is required at points closer to the roadway than at higher points.

I claim as my invention:

A headlight lens provided with four superposed horizontally-extending prisms, each subdivided into vertically disposed ribs for lateral refraction, the top and bottom prisms being so constructed that the light rays deflected thereby form the bottom portion of the beam of light, and the prism immediately above said bottom prism having a thickened portion located centrally of the lens and so constructed that the rays deflected thereby unite with the rays passing through the prism next above the last named prism, to form a mid portion of the light beam, the unthickened portions of the said last named prism being so constructed as to form a third and upper portion of the beam of light.

In testimony whereof I, the said MAURICE A. SMITH, have hereunto set my hand.

MAURICE A. SMITH.